United States Patent [19]
Genster

[11] Patent Number: 6,138,618
[45] Date of Patent: Oct. 31, 2000

[54] RADIATOR FOR A VEHICLE ENGINE

[75] Inventor: Albert Genster, Marl, Germany

[73] Assignee: WILO GmbH, Dortmund, Germany

[21] Appl. No.: 09/101,752

[22] PCT Filed: Jan. 10, 1997

[86] PCT No.: PCT/EP97/00080

§ 371 Date: Jul. 15, 1998

§ 102(e) Date: Jul. 15, 1998

[87] PCT Pub. No.: WO97/26451

PCT Pub. Date: Jul. 24, 1997

[30] Foreign Application Priority Data

Jan. 16, 1996 [DE] Germany .................. 196 01 319

[51] Int. Cl.⁷ .................................................. F01P 11/00
[52] U.S. Cl. .................................. 123/41.14; 123/41.46; 123/142.5 E
[58] Field of Search ....................... 123/41.14, 41.44, 123/41.46, 142.5 R, 142.5 E, 41.02

[56] References Cited

U.S. PATENT DOCUMENTS

| | | | |
|---|---|---|---|
| 4,212,270 | 7/1980 | Nakanishi et al. | 123/41.09 |
| 4,217,864 | 8/1980 | Theodore | 123/41.14 |
| 4,381,736 | 5/1983 | Hirayama | 123/41.1 |
| 4,475,485 | 10/1984 | Sakakibara et al. | 123/41.05 |
| 4,691,668 | 9/1987 | West | 123/41.12 |
| 4,726,325 | 2/1988 | Itakura | 123/41.1 |
| 5,299,630 | 4/1994 | Schatz | 165/10 |
| 5,372,098 | 12/1994 | Borsboom et al. | 123/41.44 |
| 5,390,632 | 2/1995 | Ikebe et al. | 123/41.02 |
| 5,558,055 | 9/1996 | Schatz | 123/142.5 R |
| 5,603,289 | 2/1997 | Kwan | 123/41.46 |
| 5,730,089 | 3/1998 | Morikawa et al. | 123/41.14 |
| 5,749,330 | 5/1998 | Inque et al. | 123/41.1 |
| 5,765,511 | 6/1998 | Schatz | 123/41.14 |
| 5,806,479 | 9/1998 | Bauer et al. | 123/142.5 R |
| 5,896,833 | 4/1999 | Aoki | 123/41.14 |

FOREIGN PATENT DOCUMENTS

| | | |
|---|---|---|
| 0 276 730 A2 | 8/1986 | European Pat. Off. . |
| 0 584 850 A1 | 3/1994 | European Pat. Off. . |
| 217 275 A1 | 1/1985 | German Dem. Rep. . |
| 19 14 860-A1 | 3/1969 | Germany . |
| 26 07 343 A1 | 8/1977 | Germany . |
| 37 02 028 A1 | 8/1988 | Germany . |
| 37 38 412 A1 | 5/1989 | Germany . |
| 40 40 196 A1 | 6/1992 | Germany . |
| 41 06 583 A1 | 9/1992 | Germany . |
| 41 17 214 A1 | 12/1992 | Germany . |
| 41 23 661 C2 | 1/1993 | Germany . |
| 41 23 678 C2 | 1/1993 | Germany . |
| 44 02 215 A1 | 1/1995 | Germany . |

*Primary Examiner*—Noah P. Kamen
*Assistant Examiner*—Hai Huynh
*Attorney, Agent, or Firm*—Ware, Fressola, Van Der Sluys & Adolphson LLP

[57] ABSTRACT

The invention relates to a cooling water circulation system of an internal combustion engine, in particular of a motor vehicle, with a radiator, a pump, and a latent heat accumulator and/or an auxiliary heating device in the circulation system, wherein the pump that circulates the cooling water is a split sleeve motor pump whose speed can be regulated in accordance with temperature measuring data of the latent heat accumulator or of the auxiliary heating device and/or of the internal combustion engine.

11 Claims, 2 Drawing Sheets

1.

2.

3.

4.

5.

RADIATOR FOR A VEHICLE ENGINE

FIELD OF THE INVENTION

The invention relates to a cooling water circulation system of an internal combustion engine, in particular of a motor vehicle, with a radiator, a pump, and a latent heat accumulator and/or an auxiliary heating device in the circulation system.

BACKGROUND

It is known to circulate the cooling water of an internal combustion engine by means of a pump that is located in the circulation system between the engine and the radiator and is driven by way of a V-belt or an electric motor. The radiator has a fan that is driven by the engine or by an electric motor. The devices required for cooling the engine must be individually attached as separate components and require a considerable amount of space in the engine compartment of a motor vehicle.

A thermostat valve is located in the cooling circulation system and is connected so that, after the startup of the internal combustion engine, the valve does not at first permit the cooling water to flow through the radiator until it is sufficiently warm. Thus the engine reaches the required operating temperature earlier.

It is furthermore known to dispose a latent heat accumulator in the cooling circulation system, which heat accumulator stores heat during the operation of the motor vehicle and retains this heat for a long time even after the motor vehicle is turned off. If the cold engine is started up, then the cooling water and the engine are immediately heated up by the latent heat accumulator, so that the emissions in a cold start are considerably reduced and the heating system is effective earlier. It is also known to locate an auxiliary heating device in the cooling circulation system, which device heats the engine and the passenger compartment before the startup.

The pump located in the cooling circulation system is not driven before the internal combustion engine is started up, so that the latent heat accumulator or the auxiliary heating device does not heat the water of the cooling circulation system. As a result, the engine only receives heated cooling water after it has been started up, so that at the beginning, it produces considerable emissions (in particular $CO_2$).

SUMMARY OF THE INVENTION

An object of the invention is to improve the cooling water circulation system in an internal combustion engine so that even before the startup of the internal combustion engine, heat is supplied to the engine and in particular, the heating system. An object of the invention is also to achieve a compact construction.

This object is achieved according to the invention by virtue of the fact that the pump circulating the cooling water is a split sleeve motor pump, whose speed can be regulated in accordance with temperature measuring data of the latent heat accumulator or of the auxiliary heating device and/or of the internal combustion engine.

The pump located in the cooling circulation system can already set the cooling circulation system into action before the startup of the internal combustion engine and can thus transport the heat of the latent heat accumulator and/or the auxiliary heating device to the engine and to the heating system heat exchanger. This heats up the internal combustion engine before the startup, so that emissions are reduced and its service life is extended. Also, comfortable temperatures in the passenger compartment are reached sooner and window panes are defrosted and defogged before driving.

This is achieved at a low structural cost and with a high degree of durability. Small outer dimensions and a simple assembly are achieved if the split sleeve motor pump forms a single integral unit along with the radiator. In this connection, the split sleeve motor pump can be completely or partly located in the radiator, particularly in the return collector or advance collector of the radiator.

It is particularly simple in terms of construction if the radiator fan and the pump are driven by the same electric motor. It is also particularly advantageous if the regulation of the split sleeve motor pump takes the place of the thermostat valve.

It is advantageous if the pump can be switched on even before the start of the internal combustion engine. In this connection, the pump can be switched on by a remote control and/or by means of a time switch. Alternatively or additionally, the pump can be switched on by unlocking a central locking system of a motor vehicle.

BRIEF FIGURE DESCRIPTION

Two exemplary embodiments of the invention are schematically represented in the drawings and will be explained in detail below, wherein the radiator, along with the associated units, respectively constitutes a structural unit whose individual parts are enclosed by a frame represented with dashed lines. The individual parts of the structural unit are depicted as partially spaced apart from one another, for the sake of graphical clarity, although they are secured tightly against one another.

DETAILED DESCRIPTION

Figure 1:
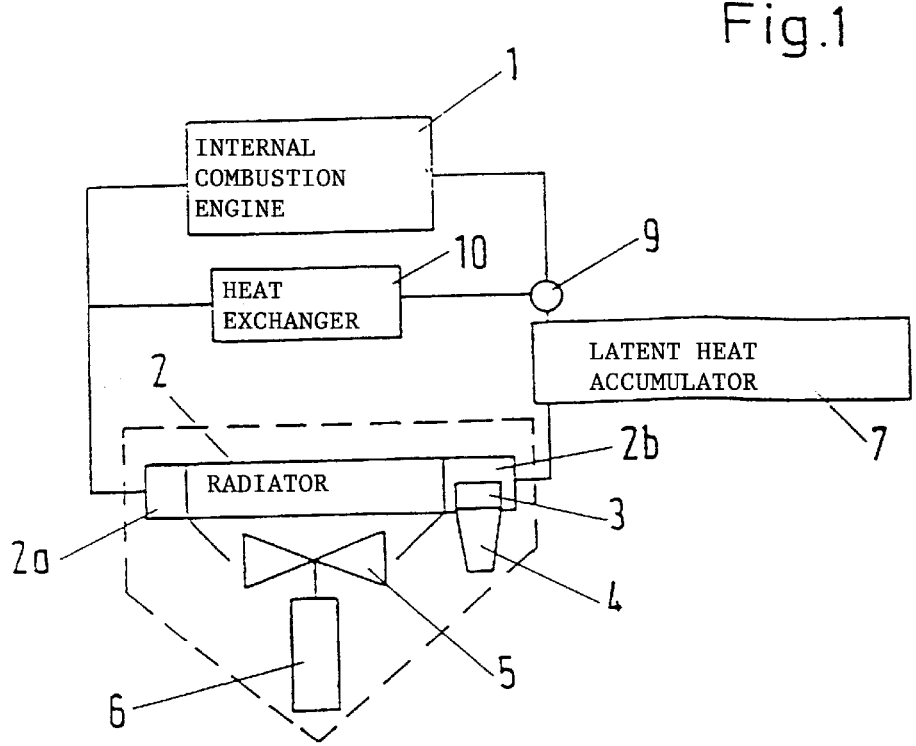
FIG. 1 shows a cooling water circulation system with a latent heat accumulator.

An internal combustion engine 1 has a cooling water circulation system 1a in which a radiator 2 is connected, wherein the radiator has a collecting receptacle 2b as an advance collector and a collecting receptacle 2a as a return collector. Parallel to the combustion engine, a heating system heat exchanger 10 is also connected in the circulation system, in order to heat up the interior of the passenger compartment.

The cooling circulation system is driven by a split sleeve type electric motor centrifugal pump, whose pump housing 3 is located inside the collecting receptacle 2a. In this instance, the housing of the pump can be formed by the radiator, in particular by the material of the collecting receptacle, so that the pump housing and collecting receptacle are integrally formed. In these exemplary embodiments, the electric motor 4 driving the pump projects outward at the collecting receptacle 2b. The electric motor of the pump and/or of the fan can be located completely or partially inside the radiator, which further reduces the outer dimensions of the entire structural unit.

A fan 5 is located on the outside of the cooling fins of the radiator 2, and its electric motor 6 is located remote from the radiator 2.

A latent heat accumulator 7 (FIG. 1) and/or an auxiliary heating device 8 (FIG. 2) is located between the internal combustion engine and the radiator in the cooling water circulation system, through which device the cooling water flows for heating, wherein the cooling water is moved by means of the motor pump 3, 4. The electric motor 4 of the pump 3 is electronically controlled in its speed according to the cooling and heating requirements, wherein temperature sensors that are located on the internal combustion engine and on the latent heat accumulator or on the auxiliary heating device, and these sensors detect the temperature of the cooling medium or components. By means of this, the regulation of the split sleeve motor pump takes the place of the thermostat valve. Even before the startup of the internal combustion engine, the pump can be switched on by means of a remote control and/or a time switch and alternatively or additionally, by means of unlocking a central locking system of a motor vehicle.

Figure 2:
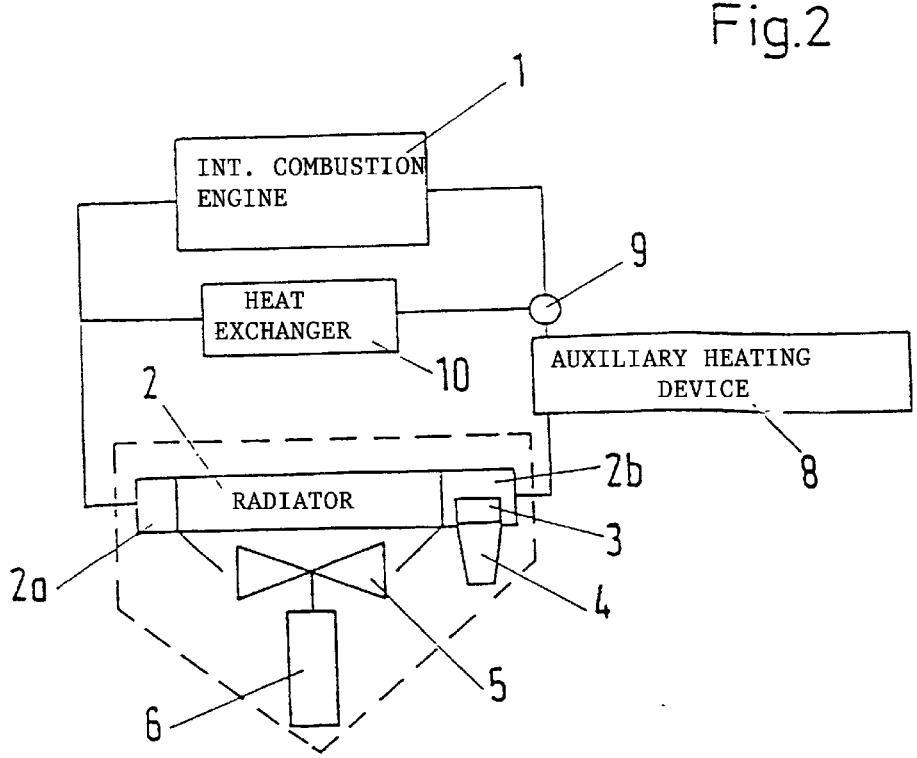
FIG. 2 shows a cooling water circulation system with an auxiliary heating device.

In the exemplary embodiments according to FIGS. 1 and 2, a valve 9 is installed in the cooling system between the internal combustion engine, the heating system heat exchanger 10, and the radiator, and this valve, among other things, controls the inflow to the heating system heat exchanger. This valve can be omitted if the heating is regulated by way of a ventilating damper.

Figure 3:
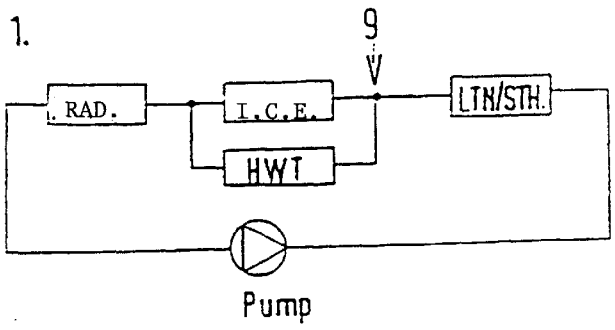
FIG. 3 shows five circuit arrangements.
Figure 3:
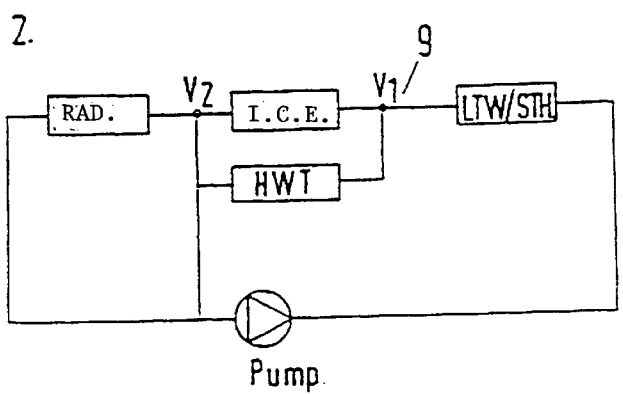
Figure 3:
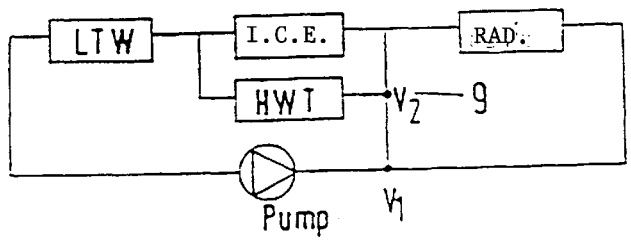
Figure 3:
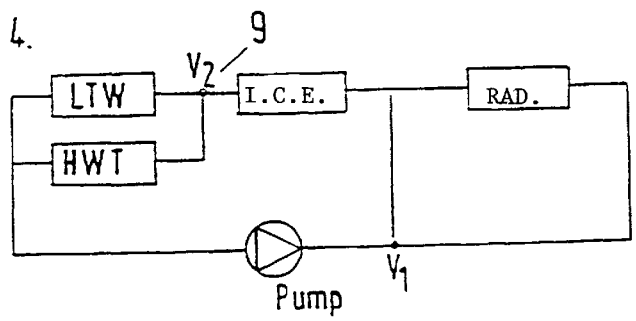
Figure 3:
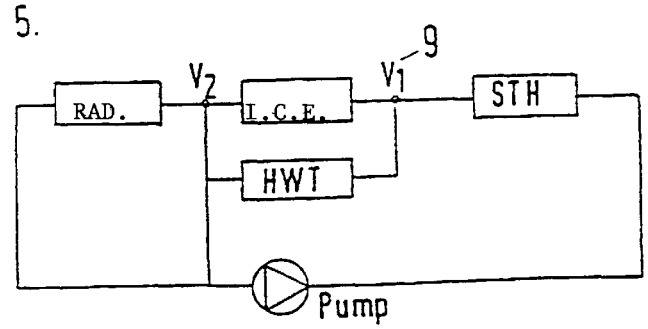

FIGS. 1 and 2 only represent arrangement examples (circuit type 1). The arrangement of the latent heat accumulator or the auxiliary heating device can also assume other positions. Other circuit types are represented by 2 through 5 in FIG. 3. In this connection, I.C.E.=internal combustion engine, LTW=latent heat accumulator or auxiliary heating device, and HWT=heating system heat exchanger.

I claim:

1. A cooling water circulation system of an internal combustion engine (1), having
   a radiator (2),
   a pump (3), means for actuating the pump even before startup of the internal combustion engine, and
   an auxiliary heating device (8) in the circulation system, wherein
      the pump (3) circulating the cooling water is a canned motor pump whose speed is regulated in accordance with temperature measuring data at a predetermined location in the circulation system.

2. The cooling water circulation system according to claim 1, wherein
   the canned motor pump (3), together with the radiator (2), forms an integral unit.

3. The cooling water circulation system according to claim 1, wherein the canned motor pump (3) is at least partially located in the radiator (2).

4. The cooling water circulation system according to claim 1, wherein
   the fan (5) of the radiator (2) and the pump (3) are driven by the same electric motor.

5. The cooling water circulation system according to claim 1, wherein
   speed regulation of the canned motor pump (3, 4) takes the place of a thermostatically controlled valve.

6. The cooling water circulation system according to claim 1, wherein said predetermined location is in the internal combustion engine (1).

7. The cooling water circulation system according to claim 1,
   wherein said pump actuating means is connected to a central locking system of a motor vehicle.

8. The cooling water circulation system according to claim 1, wherein said predetermined location is in the auxiliary heating device (8).

9. A cooling water circulation system of an internal combustion engine (1), having
   a radiator (2),
   a pump (3), means for actuating the pump even before startup of the internal combustion engine, and
   a latent heat accumulator (7) in the circulation system, wherein
      the pump (3) circulating the cooling water is a canned motor pump whose speed is regulated in accordance with temperature measuring data of the latent heat accumulator (7).

10. A cooling water circulation system of an internal combustion engine (1), having
    a radiator (2),
    a pump (3), means for actuating the pump even before startup of the internal combustion engine, and
    a latent heat accumulator (7) in the circulation system, wherein
       the pump (3) circulating the cooling water is a canned motor pump whose speed is regulated in accordance with temperature measurements at a predetermined location in the circulation system.

11. A cooling water circulation system according to claim 10,
    wherein said predetermined location is in the internal combustion engine.

* * * * *

UNITED STATES PATENT AND TRADEMARK OFFICE
CERTIFICATE OF CORRECTION

PATENT NO. : 6,138,618
DATED : October 31, 2000
INVENTOR(S) : Genster

It is certified that error appears in the above-identified patent and that said Letters Patent is hereby corrected as shown below:

INID [56] References Cited
FOREIGN PATENT DOCUMENTS
--94 19818.7  4/1985  Germany-should be added.

Abstract:
Line 6, "split sleeve" should be --canned--.

Column 1,
Line 56, "split sleeve" should be --canned--

Column 2,
Lines 6, 8, 14, and 50 "split sleeve" should be --canned--.

Column 3,
Line 10, "split sleeve" should be --canned-

Signed and Sealed this

Nineteenth Day of June, 2001

*Attest:*

*Attesting Officer*

NICHOLAS P. GODICI
*Acting Director of the United States Patent and Trademark Office*